US010773816B2

(12) United States Patent
Looper et al.

(10) Patent No.: US 10,773,816 B2
(45) Date of Patent: Sep. 15, 2020

(54) SINGLE LEVER TURBOPROP CONTROL SYSTEMS AND METHODS UTILIZING TORQUE-BASED AND POWER-BASED SCHEDULING

(71) Applicant: HONEYWELL INTERNATIONAL INC., Morris Plains, NJ (US)

(72) Inventors: Dave Looper, Tempe, AZ (US); Scot Coffey, Mesa, AZ (US); Yufei Xiong, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 99 days.

(21) Appl. No.: 16/041,515

(22) Filed: Jul. 20, 2018

(65) Prior Publication Data
US 2019/0047714 A1 Feb. 14, 2019

Related U.S. Application Data

(63) Continuation of application No. 14/861,712, filed on Sep. 22, 2015, now Pat. No. 10,040,565.

(51) Int. Cl.
*B64D 31/06* (2006.01)
*B64C 11/34* (2006.01)
(Continued)

(52) U.S. Cl.
CPC ............. *B64D 31/06* (2013.01); *B64C 11/34* (2013.01); *B64C 11/40* (2013.01); *B64D 27/10* (2013.01);
(Continued)

(58) Field of Classification Search
CPC . F02C 9/28; F02C 9/00; B64C 11/305; B64C 11/40; B64C 11/34;
(Continued)

(56) References Cited

U.S. PATENT DOCUMENTS 2,720,927 A 10/1955 Mergen et al.
4,296,601 A 10/1981 Martin
(Continued)

FOREIGN PATENT DOCUMENTS

EP 0409552 A2 1/1991
WO 93/06354 A1 4/1993
WO 2015053930 A1 4/2015

OTHER PUBLICATIONS

Extended EP Search Report for Application No. 16189552.9-1757 dated Nov. 22, 2016.
(Continued)

*Primary Examiner* — Eldon T Brockman
(74) *Attorney, Agent, or Firm* — Lorenz & Kopf, LLP

(57) ABSTRACT

Embodiments of a single lever turboprop control method and system are provided, which utilize torque-based and/or power-based scheduling to achieve a desired (e.g., substantially proportional) relationship between control lever position and the power output of a turboprop engine. In one embodiment, the method includes the step or process of monitoring, at an Engine Control Unit (ECU), for receipt of a Power Lever Angle (PLA) signal from a single lever control device. When a PLA control signal received at the ECU, a target torque or power output is established as a function of at least the PLA control signal. A first engine setpoint, such as a blade angle setpoint or an engine rotational speed setpoint, is determined utilizing the target torque output. An operational parameter of the turboprop engine is then adjusted in accordance with the first engine setpoint.

11 Claims, 3 Drawing Sheets

(51) Int. Cl.
  *B64C 11/40* (2006.01)
  *B64D 27/10* (2006.01)
  *B64D 31/04* (2006.01)
  *B64D 31/14* (2006.01)

(52) U.S. Cl.
  CPC ............ *B64D 31/04* (2013.01); *B64D 31/14* (2013.01); *B60W 2710/0666* (2013.01)

(58) Field of Classification Search
  CPC ... F05D 2270/304; B64D 31/06; B64D 31/14; B64D 31/04; B64D 27/10; B60W 2710/0666
  See application file for complete search history.

(56) References Cited

U.S. PATENT DOCUMENTS

| | | | |
|---|---|---|---|
| 4,533,296 A | 8/1985 | Duchesneau et al. | |
| 4,588,354 A | 5/1986 | Duchesneau et al. | |
| 4,648,797 A | 3/1987 | Martin | |
| 4,794,755 A | 1/1989 | Hutto, Jr. et al. | |
| 5,042,966 A | 8/1991 | Schwartz et al. | |
| 5,206,805 A | 4/1993 | Petzold et al. | |
| 5,315,819 A * | 5/1994 | Page ..................... | F02C 9/28 416/30 |
| 5,364,231 A | 11/1994 | Eick et al. | |
| 5,810,560 A | 9/1998 | Tanaka | |
| 6,059,528 A | 5/2000 | Danielson et al. | |
| 6,077,040 A | 6/2000 | Pruden et al. | |
| 6,422,023 B1 | 7/2002 | Dudd, Jr. et al. | |
| 7,873,445 B2 | 1/2011 | Schaeffer | |
| 7,975,671 B2 | 7/2011 | Perie et al. | |
| 8,099,227 B2 | 1/2012 | Shafique et al. | |
| 8,439,640 B2 | 5/2013 | Arel et al. | |
| 8,566,000 B2 | 10/2013 | Lickfold et al. | |
| 8,651,811 B2 | 2/2014 | Danielson | |
| 2007/0110577 A1 | 5/2007 | Danielson | |
| 2010/0241331 A1 | 9/2010 | Duke et al. | |

OTHER PUBLICATIONS

Povan J et al. "Introduction to Advanced Modeling and Control of Turbo-Prop Engines", Intelligent Engineering Systems (INES), 2012 IEEE 16th International Conference on IEEE, Jun. 13, 2012, XP032211307, p. 271-77.
SmartCockpit; Dash8-Q400 Propeller; Retrieved from: http://www.google.com/url?url=http://www.smartcockpit.com; Jun. 29, 2015.
Wijerathne, C.; Turbine Engine Fuel System—General Requirements; Aeronautics Guide; Retrieved from: http://okigihan.blogspot.com/p/turbine-engine-fuel-systemgeneral.html; Jun. 29, 2015.

* cited by examiner

SINGLE LEVER TURBOPROP CONTROL SYSTEMS AND METHODS UTILIZING TORQUE-BASED AND POWER-BASED SCHEDULING

CROSS-REFERENCE TO RELATED APPLICATION

This application is a continuation of co-pending U.S. application Ser. No. 14/861,712, filed with the United States Patent and Trademark Office on Sep. 22, 2015.

TECHNICAL FIELD

The following disclosure relates generally to gas turbine engines and, more particularly, to single lever turboprop control systems and methods utilizing torque-based and/or power-based scheduling to achieve a desired (e.g., substantially proportional) relationship between control lever position and the power output of a turboprop engine.

BACKGROUND

Fixed wing aircraft are commonly equipped with one of three types of propulsive gas turbine engines: turboprop, turbofan, or turbojet engines. Turbofan and turbojet engines are typically operated utilizing a single lever control system, which includes a cockpit lever movable through a range of angular positions to schedule engine thrust. Turboprop engines, by comparison, are typically operated utilizing a dual lever control system, which includes a first cockpit lever for controlling propeller blade angle and a second cockpit lever for controlling engine rotational speed. Thus, relative to single lever turbofan and turbojet control systems, dual lever turboprop control systems differ fundamentally in the design of the pilot interface and the manner in which the engine is controlled. In further contrast to single lever turbofan and turbojet control systems, dual lever turboprop control systems typically do not provide pilot controls for adjusting the thrust or power output of the turboprop engine in a direct manner. Such disparities in the control systems of turboprop, turbofan, and turbojet engines can increase operational complexity, necessitate additional pilot training, and result in a general lack of familiarity on behalf of the pilot when transitioning between aircraft equipped with different types of propulsive gas turbine engines.

BRIEF SUMMARY

Embodiments of a single lever turboprop control method are provided, which utilize torque-based and/or power-based scheduling to achieve a desired (e.g., substantially proportional) relationship between control lever position and the power output of a turboprop engine. In one embodiment, the method includes the step or process of monitoring, at an Engine Control Unit (ECU), for receipt of a Power Lever Angle (PLA) signal from a single lever control device. When a PLA control signal received at the ECU, a target torque or power output is established as a function of at least the PLA control signal. A first engine setpoint, such as a blade angle setpoint or an engine rotational speed setpoint, is selectively determined utilizing the target torque output. An operational parameter of the turboprop engine, such as engine rotational speed and/or propeller blade angle, is then adjusted in accordance with the first engine setpoint.

In a further embodiment, the single lever turboprop control method includes monitoring, at an ECU, for receipt of a PLA control signal from a single lever control device. When a PLA control signal is received at the ECU, a target power output for the turboprop engine is established as a function of at least the PLA control signal. A first engine setpoint, such as a blade angle setpoint or an engine rotational speed setpoint, can then be selectively determined utilizing the target power output. Finally, an operational parameter of the turboprop engine, such as engine rotational speed and/or propeller blade angle, is adjusted in accordance with the first engine setpoint.

Embodiments of a single lever turboprop control system are further provided. In one embodiment, the single lever turboprop control system includes a single lever control device to which an ECU is coupled. The ECU monitors for receipt of a PLA control signal from the single lever control device. When a PLA control signal received at the ECU, the ECU establishes a target engine output for the turboprop engine as a function of at least the PLA control signal. The target engine output is selected from the group consisting of a target torque output and a target power output. The ECU further determines a first engine setpoint utilizing the target engine output and then adjusts an operational parameter of the turboprop engine, such as engine rotational speed and/or propeller blade angle, in accordance with the first engine setpoint.

BRIEF DESCRIPTION OF THE DRAWINGS

At least one example of the present invention will hereinafter be described in conjunction with the following figures, wherein like numerals denote like elements, and.

DETAILED DESCRIPTION

Figure 1:
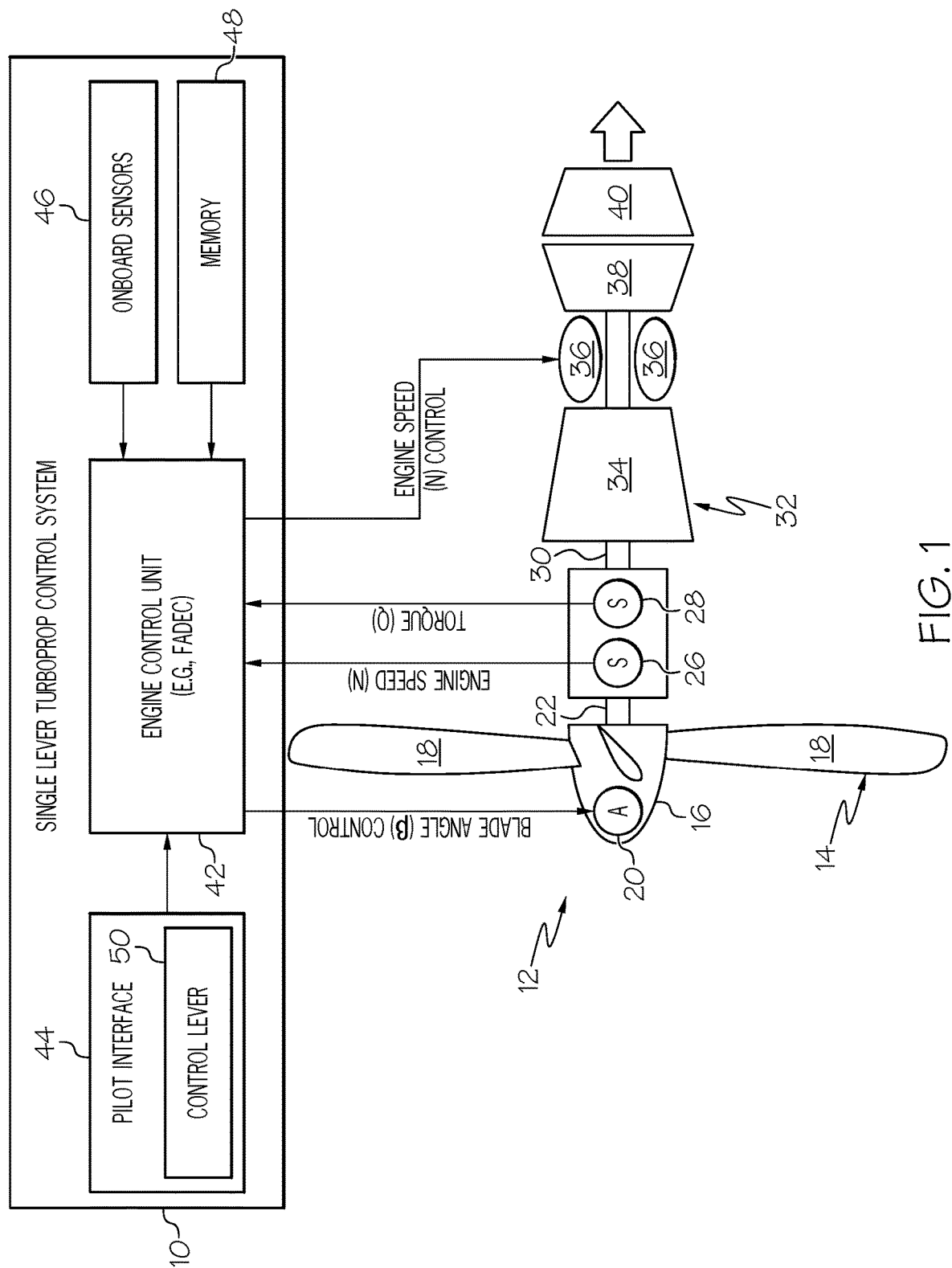
FIG. 1 is a schematic of a single lever turboprop control system and a turboprop engine, as illustrated in accordance with an exemplary embodiment of the present invention.

The following Detailed Description is merely exemplary in nature and is not intended to limit the invention or the application and uses of the invention. Furthermore, there is no intention to be bound by any theory presented in the preceding Background or the following Detailed Description.

As briefly described above, turboprop engines are traditionally operated utilizing a dual lever control system, which includes a first lever for adjusting propeller blade angle ($\beta$) and a second, independent lever for adjusting engine rotational speed (N). Recently, certain turboprop control systems have been proposed that enable a pilot to adjust both propeller blade angle ($\beta$) and engine rotational speed (N) utilizing a single control lever located in the aircraft cockpit. During operation, such a single lever turboprop control system may convert or "schedule" the angular position of the control lever to a corresponding propeller blade angle setpoint ($\beta_{set}$) and a corresponding rotational speed setpoint ($N_{set}$). The blade angle and rotational speed setpoints ($\beta_{set}$ and $N_{set}$) are then applied to the turboprop engine by commanding one or more actuation systems to adjust the blade angle and rotational speed of the turboprop engine in accordance with the newly-established setpoints. In this manner, the turboprop engine can be operated utilizing a single lever control system mimicking or emulating the single lever control systems utilized in the operation of turbofan and turbojet engines. Advantageously, such a single lever turboprop control system helps simplify operating procedures and improves commonality between the pilot interfaces utilized to operate turboprop, turbofan, and turbojet engines.

While providing the above-noted benefits, conventionally-proposed single lever turboprop control systems remain limited in a number of respects. For example, when implemented as described above, a single lever turboprop control system may not provide a substantially proportional relationship between PLA position and turboprop engine power (also referred to herein as "shaft horsepower" and identified by the abbreviation "SHP"). Significantly, engine power (SHP) is the controlled parameter of a turboprop engine most closely corresponding with the thrust output of turbofan and turbojet engines, which is typically scheduled in a direct proportional relationship with PLA position. Turboprop engine power (SHP) is the product of engine torque (Q) multiplied by engine rotational speed (N), as expressed by the following equation:

$$Q \times N = SHP \qquad EQ. 1$$

Engine torque (Q), engine power (SHP), and the thrust generated by the turboprop engine can vary for a given pair of blade angle ($\beta$) and rotational speed (N) setpoints depending upon a number of non-controlled variables, such as the current altitude at which the aircraft (A/C) is traveling, aircraft speed, and other conditions. In the case of a single lever turboprop controls system wherein the blade angle ($\beta$) and rotational speed (N) of a turboprop engine are derived directly from PLA position in the manner previously described, the turboprop engine may provide a different thrust output each time the pilot moves the control lever to a particular angular position. Consequently, there may continue to exist an undesirable disparity in the behavior of a turboprop engine controlled utilizing a single lever control system of the type described above as compared to a turbofan or turbojet engine operated utilizing a similar single lever control system.

The following describes embodiments of systems and methods enabling single lever control of a turboprop engine wherein blade angle ($\beta$) and/or rotational speed (N) are adjusted in a manner providing a desired (e.g., substantially proportional) relationship between PLA position and the power output (SHP) of the turboprop engine. Embodiments of the single lever turboprop control system provide such a desired PLA-to-SHP relationship by first converting a PLA input signal to target torque output ($Q_{tar}$), to a target power output ($SHP_{tar}$), or to a combination thereof. The target power output ($SHP_{tar}$) can be expressed as either a discrete power level (SHP) or a percentage (% SHP) of a reference (e.g., maximum) power level. In arriving at the target power output ($SHP_{tar}$) and/or the target torque output ($Q_{tar}$), other input data may also be considered in addition to the PLA input signal. Such other input data can include sensor data describing current environmental, flight, and operating conditions of the A/C. At least one engine setpoint is then established as a function of the target torque output ($Q_{tar}$) and/or the target power output ($SHP_{tar}$). The engine setpoint or setpoints can be one or both of a blade angle setpoint ($\beta_{set}$) and a rotational speed setpoint ($N_{set}$). The newly-established engine setpoints are then applied to the turboprop engine by commanding the appropriate actuation systems to make the desired adjustments in blade angle and/or engine speed. In this manner, embodiments of the turboprop control system not only provide a single lever pilot interface similar to that of a turbofan or turbojet control system, but further achieve a substantially proportional relationship between PLA position and engine thrust similar more closely resembling the PLA position-to-thrust relationships provided by turbofan and turbojet control systems. This is highly desirable.

Embodiments of the single lever turboprop control systems and methods described herein can provide still further benefits and functionalities. For example, in certain embodiments, the single lever turboprop control system may be operable in multiple different scheduling modes, which can be selected in response to pilot input, changes in flight phase, or other such factors to help optimize engine performance across the entire flight cycle of the A/C. Furthermore, in certain embodiments, the single lever turboprop control system can include an active feedback component (e.g., a closed feedback loop), which actively adjusts the blade angle ($\beta$) and/or rotational speed (N) of the turboprop engine to reduce any measured discrepancies between the target torque output ($Q_{tar}$) and the current torque output ($Q_{current}$) and/or the target power output ($SHP_{tar}$) and the current engine power ($SHP_{current}$). Through the inclusion of such an active feedback component, the desired (e.g., proportional) relationship between PLA position and turboprop power output can be better maintained, while further enabling the turboprop control system to automatically adapt to changes in environmental conditions. Finally, embodiments of the single lever turboprop control system can further include one or more limiting functions enabling the power/torque-based scheduling logic to be overridden when appropriate to prevent operating parameters of the turboprop engine (e.g., bleed air temperatures, exhaust gas temperatures, mechanical stress levels, flow rates, etc.) from exceeding predefined thresholds to help reduce component wear, avoid component damage, and generally prolong the serviceable lifespan of the turboprop engine.

FIG. 1 is a schematic of a single lever turboprop control system 10 and single shaft turboprop engine 12, as illustrated in accordance with an exemplary embodiment of the present invention. While turboprop control system 10 is illustrated in conjunction with a particular type of turboprop engine 12 in FIG. 1, it will be appreciated that single lever turboprop control system 10 can be utilized in conjunction with various other types of turboprop engines, including both fixed shaft (e.g., single shaft) and free turbine-type turboprop engines. Single lever turboprop control system 10 is described below in detail in conjunction with FIGS. 1-3, as are several power/torque-based scheduling processes that can be carried-out by turboprop control system 10 during operation thereof. First, however, a description of turboprop engine 12 is provided to establish an exemplary and non-limiting context in which embodiments of single lever turboprop control system 10 can be better understood.

In the exemplary embodiment illustrated in FIG. 1, turboprop engine 12 includes a propeller 14 having a propeller dome 16 from which a number of blades 18 project in a radially-outward direction. A Propeller Pitch Control (PPC) actuator 20 is at least partially housed within propeller dome 16 and can adjust the angle or pitch of propeller blades 18 in accordance with commands received from turboprop control system 10. PPC actuator 20 can include or assume the form of a mechanical actuation system, a hydraulic actuation system, a hydromechanical actuation system, or another type of actuation system suitable for adjusting the angle or pitch of propeller blades 18 in response to commands received from turboprop control system 10.

A shaft 22 projects from propeller 14 in an aftward direction to mechanically couple propeller 14 to a gearbox 24 containing a gear reduction (referred to hereafter as "reduction gearbox 24"). As schematically indicated in FIG. 1, reduction gearbox 24 can contain a first sensor 26 for measuring the current rotational speed of turboprop engine 12 ($N_{current}$) and a second sensor 28 for measuring the current torque output of engine 12 ($Q_{current}$). A single shaft 30 links the mechanical input of gearbox 24 to a gas turbine engine core 32. Engine core 32 includes a compressor section 34, a combustion section 36, a turbine section 38, and an exhaust section 40 coupled in flow series. Compressor section 34 can contain any type of compressors (e.g., axial and/or centrifugal compressors commonly referred to as "impellers"), any number of compressors, and any number of compressor stages separated by non-rotating vanes. Similarly, turbine sections 38 can contain any type of turbines (e.g., axial and/or radial turbines), any number of turbines, and any number of turbine stages separated by non-rotating vanes. While shown as including a single shaft in the illustrated example, turboprop engine 12 can include two or more co-axial shafts and varying numbers of compressor and turbines in further embodiments. Furthermore, while turboprop engine 12 is depicted as a single or fixed-shaft engine in FIG. 1, it is again emphasized that that turboprop control system 10 can also be utilized in conjunction with free turbine turboprop engines. In free turbine platforms, rotation of the propeller is driven by a separate turbine, which is fluidly (rather than mechanically) coupled to and driven by the combustive gasses generated by the core gas turbine engine.

During operation of turboprop engine 12, the compressor(s) within compressor section 34 rotate to compress airflow ingested by turboprop engine 12 through a non-illustrated intake section. The compressed airflow is then directed into one or more combustion chambers located within combustion section 36, mixed with fuel, and ignited. The combustive gasses heat rapidly, expand, and flow from combustion section 36 into turbine section 38 to drive rotation of turbine or turbines contained therein. Rotation of the turbine(s) within section 38 drives rotation of shaft 30, which, in turn, drives rotation of propeller 14 through reduction gearbox 24. The desired thrust output of turboprop engine 12 is largely provided by the rotation of propeller 14. However, a relatively small amount of additional thrust may also be provided the combustive gases discharged from turboprop engine 12 through exhaust section 40.

Turboprop control system 10 enables a pilot to adjust a number of operational parameters of turboprop engine 12 including the blade angle (β) of propeller blades 18 and the rotational speed (N) of engine core 32. As noted above, adjustments in propeller blade angle (β) can be implemented by applying the appropriate commands to PPC actuator 20. Turboprop control system 10 can also modulate the engine rotational speed (N) of turboprop engine 12 by sending appropriate command signals to a non-illustrated fuel metering system. As indicated in FIG. 1 by an arrow connecting turboprop control system 10 to combustion section 36, the fuel metering system may then increase or decrease the amount of burn fuel supplied to combustion section 36 to effectuate the desired engine speed adjustment. In certain embodiments, turboprop control system 10 may also regulate the engine rotational speed (N) utilizing various other non-illustrated features or devices included within of turboprop engine 12 and well-known within the avionics industry. Such other features can include, but are not limited to, variable inlet guide vanes, variable stator vanes, and bypass bleed valves.

With continued reference to the exemplary embodiment shown in FIG. 1, single lever turboprop control system 10 is schematically illustrated as including the following components, each of which may be comprised of multiple devices, systems, or elements: (i) an engine control unit or "ECU" 42, (ii) a pilot interface 44, (iii) a number of onboard sensors 46, and (iv) a memory 48. As schematically indicated in FIG. 1, pilot interface 44, onboard sensors 46, and memory 48 can be coupled to various inputs and/or outputs of ECU 42, as appropriate, to carry-out the processing and control functions described herein. In this regard, the components of turboprop control system 10 can be interconnected utilizing any suitable aircraft interconnection architecture, which may include any combination of wired and wireless data connections. In many cases, the components of turboprop control system 10 will communicate over an avionics bus, which permits bidirectional signal communication with ECU 42. The individual elements and components of turboprop control system 10 can be implemented in a distributed manner using any number of physically-distinct and operatively-interconnected pieces of hardware or equipment. Furthermore, alternative embodiments of turboprop control system 10 can include other components in addition to or in lieu of those listed above. For example, in further embodiments, turboprop control system 10 can include a second ECU, which functions in parallel with ECU 42 and also performs the below-described processes for purposes of redundancy.

ECU 42 can include or assume the form of any electronic device, system, or combination of devices suitable for performing the processing and control functions described herein. More specifically, ECU 42 can be implemented utilizing any suitable number of individual microprocessors, automated flight control equipment, memories, power supplies, storage devices, interface cards, and other standard components known in the art. Additionally, the ECU 42 may include or cooperate with any number of software programs (e.g., automated flight control logic programs) or instructions designed to carry-out various methods, process tasks, calculations, and control functions described herein. In one embodiment, and by way of non-limiting example only, ECU 42 is a digital engine controller, such as a Full Authority Digital Engine Controller or "FADEC."

Memory 48 can include any number of volatile and/or non-volatile memory elements. In many embodiments, memory 48 will include a central processing unit register, a number of temporary storage areas, and a number of permanent storage areas. Memory 48 can also include one or more mass storage devices, such as magnetic hard disk drives, optical hard disk drives, flash memory drives, and the like. Memory 48 can store various programs and applications, which are executed by ECU 42 to perform the below-described control functions. In certain embodiments, memory 48 will store multiple formulae, multi-dimensional lookup tables, and/or the like suitable for converting PLA position and other inputs into various combinations of target torque outputs ($Q_{tar}$), target power outputs ($SHP_{tar}$), blade angle setpoints ($β_{set}$), and/or rotational speed setpoints ($N_{set}$) as described in detail below. Memory 48 may also store predetermined operational thresholds, such as maximum temperatures and flow rates, below which the operational parameters of turboprop engine 12 are desirably maintained.

Although illustrated as a distinct block in FIG. 1, memory 48 can be incorporated into ECU 42 in further embodiments of turboprop control system 10.

Onboard sensors 46 generate, measure, and/or provide different types of data related to the operational status of the A/C, the operational environment in which A/C operates, current flight parameters, and the like. Onboard sensors 46 can include or cooperate any number of distinct avionic systems including, but not limited to, a Flight Management Systems (FMSs), Inertial Reference Systems (IRSs), and/or Attitude Heading Reference Systems (AHRSs). Data provided by onboard sensors 46 may include, without limitation: airspeed data; groundspeed data; altitude data; attitude data including pitch data and roll data; yaw data; geographic position data, such as Global Positioning System (GPS) data; time/date information; heading information; weather information; flight path data; track data; radar altitude; geometric altitude data; wind speed data; wind direction data; fuel consumption; etc. Although schematically illustrated as separate symbols for illustrative clarity in FIG. 1, onboard sensors 46 can also include various sensors deployed within turboprop engine 12 including, for example, sensors 26 and 28 contained in reduction gearbox 24. ECU 42 is configured to process data obtained from onboard sensors 46 to perform the turboprop control functions described more fully below in conjunction with FIGS. 2 and 3.

With continued reference to FIG. 1, pilot interface 44 can include any number of input devices (e.g., switches, dials, buttons, keyboards, cursor devices, cameras, microphones, etc.) suitable for receiving pilot input data useful in operating turboprop engine 12 via turboprop control system 10. As a primary feature, pilot interface 44 includes a single lever control device 50 located in the A/C cockpit and coupled to an input of ECU 42. Single lever control device 50 includes a control lever, which can be moved through a range of angular positions by a pilot when operating the A/C carrying turboprop control system 10 and turboprop engine 12. When moved to a particular angular position, single lever control device 50 supplies a Power Lever Angle ("PLA") position signal to ECU 42. In response, ECU 42 converts the PLA control signal into a corresponding blade angle setpoint ($\beta_{set}$) and/or a corresponding rotational speed setpoint ($N_{set}$), which are then applied to turboprop engine 12 utilizing the appropriate actuation systems. For example, turboprop control system 10 may command PPC actuator 20 to implement any desired changes in blade angle ($\beta$) and/or command the non-illustrated fuel metering system to modulate the amount of burn fuel supplied to combustion section 36 to effectuate desired changes in engine rotational speed (N). In accordance with embodiments of the present invention, ECU 42 converts the PLA control signal to one or more setpoints (e.g., blade angle and/or rotational speed setpoints) utilizing a power/torque-based scheduling process. An exemplary embodiment of such power/torque-based scheduling process will now be described in conjunction with FIG. 2.

Figure 2:
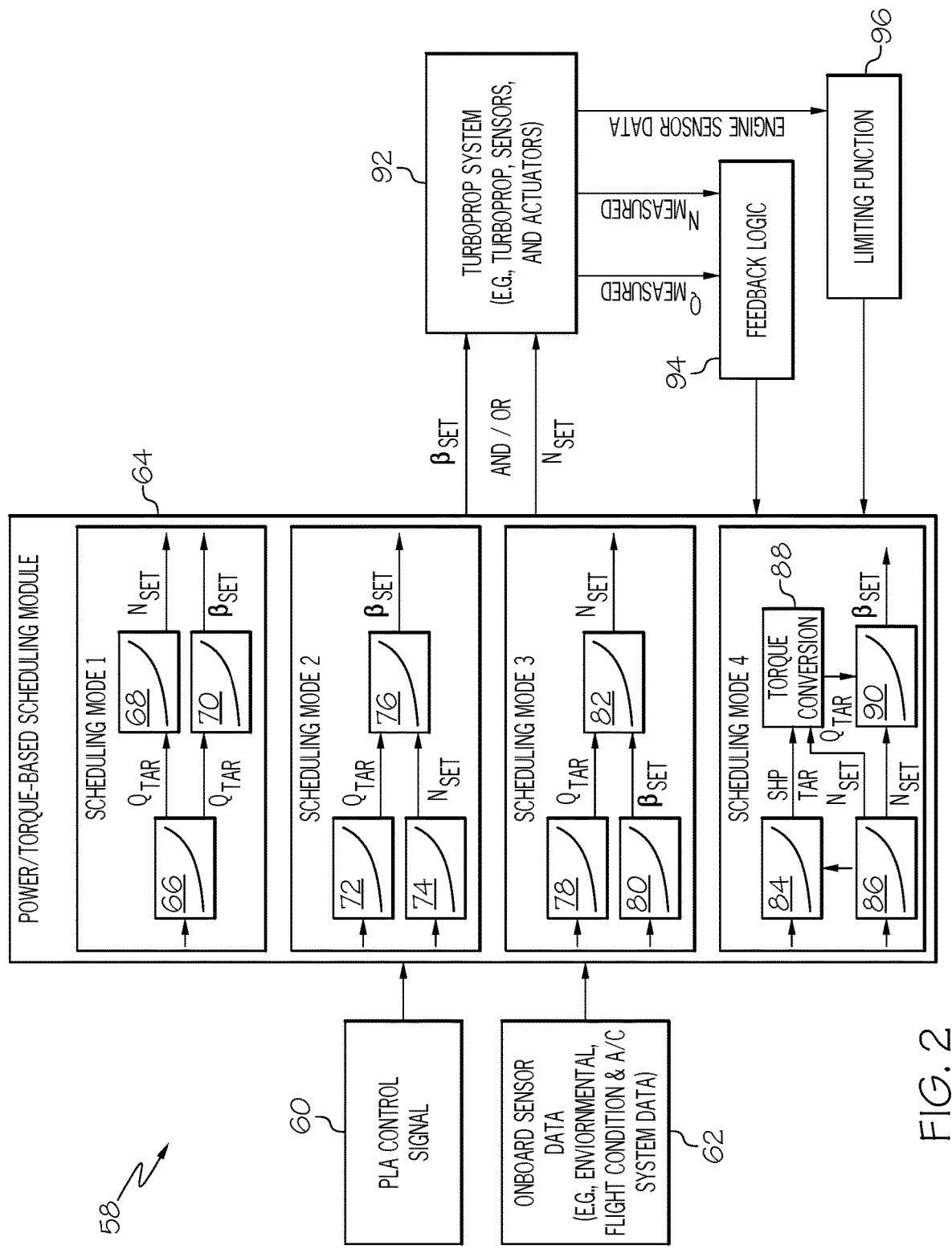
FIG. 2 is a schematic illustrating a power/torque-based scheduling process, which can be carried-out by the single lever turboprop control system of FIG. 1 and which is illustrated in accordance with a further exemplary embodiment of the present invention.

FIG. 2 is a schematic illustrating a power/torque-based scheduling process 58, which can be implemented utilizing any suitable combination of software, hardware, and firmware and selectively carried-out by turboprop control system 10 (FIG. 1) during operation thereof. Scheduling process 58 commences with receipt of a PLA control signal 60 at the input of a scheduling module 64. PLA control signal 60 can be continually or periodically provided to scheduling module 64; or, instead, only supplied to scheduling module 64 when single lever control device 50 (FIG. 1) is moved into a new position. Other inputs may also be provided to scheduling module 64 in conjunction with PLA control signal 60. Such other inputs can include A/C sensor data 62 obtained from onboard sensors 46 (FIG. 1) and describing environmental conditions, flight conditions, and/or operating characteristics of turboprop engine 12. Such sensor data will often include the current rotational speed of turboprop engine 12 ($N_{current}$), as monitored by sensor 26 within gearbox 24 (FIG. 1); and the current torque output of engine 12 ($Q_{current}$), as monitored by sensor 28 within gearbox 24. In certain embodiments, A/C sensor data 62 may also include information from which the current flight phase can be derived and subsequently utilized in selecting amongst a number of scheduling modes, such as SCHEDULING MODES 1-4 shown in FIG. 2 and described below. Onboard sensor data 62 may still further include other types of information utilized in determining the target torque output ($Q_{tar}$) and/or target power output ($SHP_{tar}$) values.

Scheduling module 64 may be operable in a single mode. Alternatively, scheduling module 64 may be selectively operable in multiple scheduling modes, which may be selectively implemented under varying conditions. In the illustrated example, scheduling module 64 is operable four different operational modes, which are identified in FIG. 2 as "SCHEDULING MODES 1-4." When executed by ECU 42 (FIG. 1), scheduling module 64 selects the appropriate scheduling mode for current usage. This selection may be made based upon pilot input received via pilot interface 44 (FIG. 1) or in response to changes in any combination of environmental factors, flight conditions, or A/C system characteristics detected by onboard sensors 46. Scheduling module 64 may, for example, select amongst SCHEDULING MODES 1-4 based upon the current flight phase of the A/C and the current operational mode of turboprop engine 12. In one implementation, and by way of non-limiting example only, SCHEDULING MODES 1, 2, 3, and 4 may be selectively activated depending upon whether turboprop engine 12 is operating in ground, flight idle, takeoff, climb, cruise, or descent modes. In further embodiments, scheduling module 64 and, more generally, scheduling process 58 executed by ECU 42 can include fewer or a greater number of scheduling modes.

When operating in SCHEDULING MODE 1, scheduling module 64 first converts PLA control signal 60 and onboard sensor data 62 to a target torque output ($Q_{tar}$) utilizing a conversion function 66 (hereafter "PLA-to-Q conversion function 66"). PLA-to-Q conversion function 66 can be a multi-dimensional lookup table, a formula, or any other logic tool suitable for generating a target torque output ($Q_{tar}$) as a function of the input data. The target torque output ($Q_{tar}$) is then applied to two additional conversion functions: (i) a Q-to-N conversion function 68, which converts the target torque output ($Q_{tar}$) to a corresponding rotational engine speed setpoint ($N_{set}$); and (ii) a Q-to-$\beta$ conversion function 70, which converts the target torque output ($Q_{tar}$) to a corresponding blade angle setpoint ($\beta_{set}$). Onboard sensor data 62 may or may not be applied to Q-to-N conversion function 68 and Q-to-$\beta$ function 70 for consideration in establishing the engine speed setpoint ($N_{set}$) and the blade angle setpoint ($\beta_{set}$), respectively. Turboprop control system 10 (FIG. 1) then generates commands in accordance with the newly-established engine speed setpoint ($N_{set}$) and the blade angle setpoint ($\beta_{set}$), which are delivered to the appropriate actuation systems to adjust the engine speed and blade angle of turboprop engine 12. The actuation systems, turboprop engine 12, and the sensors monitoring the operational parameter of engine 12 are collectively represented by a box 92 in FIG. 2 and labeled as "TURBOPROP SYSTEM."

SCHEDULING MODES 2 and 3 are similar to SCHEDULING MODE 1 in that, when operating in either of these modes, scheduling module 64 converts PLA control signal 60 and sensor data 62 to a target torque output ($Q_{tar}$). However, in contrast to SCHEDULING MODE 1, only a single type of engine setpoint is generated by scheduling module 64 when operating in either SCHEDULING MODE 2 or SCHEDULING MODE 3. When operating in SCHEDULING MODE 2, specifically, scheduling module 64 converts PLA control signal 60 and onboard sensor data 62 to a target torque output ($Q_{tar}$) utilizing a PLA-to-Q conversion function 72. Concurrently or sequentially, scheduling module 64 further converts PLA control signal 60 and onboard sensor data 62 to a rotational speed setpoint ($N_{set}$) utilizing a PLA-to-N conversion function 74. Both the target torque output ($Q_{tar}$) and the rotational speed setpoint ($N_{set}$) are then applied to a Q/N-to-β conversion function 76, which generates a blade angle setpoint ($β_{set}$) for application to turboprop system 92. By comparison, when operating in SCHEDULING MODE 3, scheduling module 64 likewise converts PLA control signal 60 and onboard sensor data 62 to a target torque output ($Q_{tar}$) utilizing a PLA-to-Q conversion function 78. However, in contrast to SCHEDULING MODE 2, scheduling module 64 further converts PLA control signal 60 and onboard sensor data 62 to a blade angle setpoint ($β_{set}$) utilizing a PLA-to-β conversion function 80. Both the target torque output ($Q_{tar}$) and the blade angle setpoint ($β_{set}$) are then applied to a Q/β-to-N conversion function 82, which generates a rotational speed setpoint ($N_{set}$). The rotational speed setpoint ($N_{set}$) is then applied to turboprop system 92 for implementation utilizing the appropriate actuation systems associated with turboprop engine 12 (FIG. 1), as previously described.

Addressing lastly SCHEDULING MODE 4, this operational mode is similar to SCHEDULING MODES 1-3 in that a target torque output ($Q_{tar}$) is calculated or otherwise established by scheduling module 64. However, in the case of SCHEDULING MODE 4, the target torque output ($Q_{tar}$) is not directly derived from PLA control signal 60, but is instead determined from a target power output ($SHP_{tar}$), which is itself determined as a function of PLA control signal 60. As can be seen in FIG. 2, two functions are initially performed when executing SCHEDULING MODE 4: (i) a PLA/N-to-SHP conversion function 84, and (ii) a PLA-to-N conversion function 86. As does PLA-to-N conversion function 74 described above in conjunction with SCHEDULING MODE 2, PLA-to-N conversion function 86 converts PLA control signal 60 and onboard sensor data 62 to a rotational speed setpoint ($N_{set}$). The rotational speed setpoint ($N_{set}$) generated by conversion function 86 is applied to PLA/N-to-SHP conversion function 84, which then determines a target power output ($SHP_{tar}$) as a function of the current $N_{set}$ value, the current PLA control signal 60, and the current onboard sensor data 62. The target power output ($SHP_{tar}$) can be expressed as either a discrete power level (SHP) or a percentage (% SHP) of a reference power level. The target power output ($SHP_{tar}$) output from PLA/N-to-SHP conversion function 84 is then supplied to a conversion function 86 along with the current rotational speed setpoint ($N_{set}$). Conversion function 86 next determines the target torque output ($Q_{tar}$) from these data inputs by, for example, dividing-out the current $N_{set}$ value from the target power output ($SHP_{tar}$). Finally, the target torque output ($Q_{tar}$) and the rotational speed setpoint ($N_{set}$) are applied to a Q/N-to-β conversion function 90, which generates a blade angle setpoint ($β_{set}$) for application to turboprop system 92.

By executing scheduling process 58 (FIG. 2) in the above-described manner, ECU 42 (FIG. 1): (i) establishes a target power output ($SHP_{tar}$) and/or the target torque output ($Q_{tar}$) as a function of at least the PLA control signal 60, (ii) determines one or more engine setpoint adjustments to bring turboprop engine 12 into closer conformity with the target power output ($SHP_{tar}$) or the target torque output ($Q_{tar}$), and (iii) implements the setpoint adjustments by providing the appropriate commands to the turboprop actuation systems. ECU 42 can thus perform scheduling process 58 to provide a desired (e.g., substantially proportional relationship) between PLA position and the power output of turboprop engine 12 and, therefore, the thrust output of engine 12. This notwithstanding, there may still exist unavoidable discrepancies between the actual thrust output of turboprop engine 12 and the desired thrust output of engine 12 after initial adjustment of the engine setpoints. Therefore, as further indicated in FIG. 2, it may be desirable to integrate feedback logic 94 into scheduling process 58. Feedback logic 94 can receive data from sensors included within turboprop system 92 (e.g., sensors 26 and 28 illustrated in FIG. 1) indicating the current measured torque output ($Q_{current}$) and/or the current measured rotational speed ($N_{current}$) of turboprop engine 12 (FIG. 1). Feedback logic 94 may then cooperate with scheduling module 64 to determine further adjustments to the blade angle (β) and/or rotational speed (N) of the turboprop engine to reduce discrepancies between the target torque output ($Q_{tar}$) and the currently-measured torque output ($Q_{current}$) and/or the target power output ($SHP_{tar}$) and the currently-measured engine power ($SHP_{current}$). One exemplary manner in which feedback logic 94 and scheduling module 64 can perform this function when module 64 operates in a variation of SCHEDULING MODE 4 will now be described in conjunction with FIG. 3.

Figure 3:
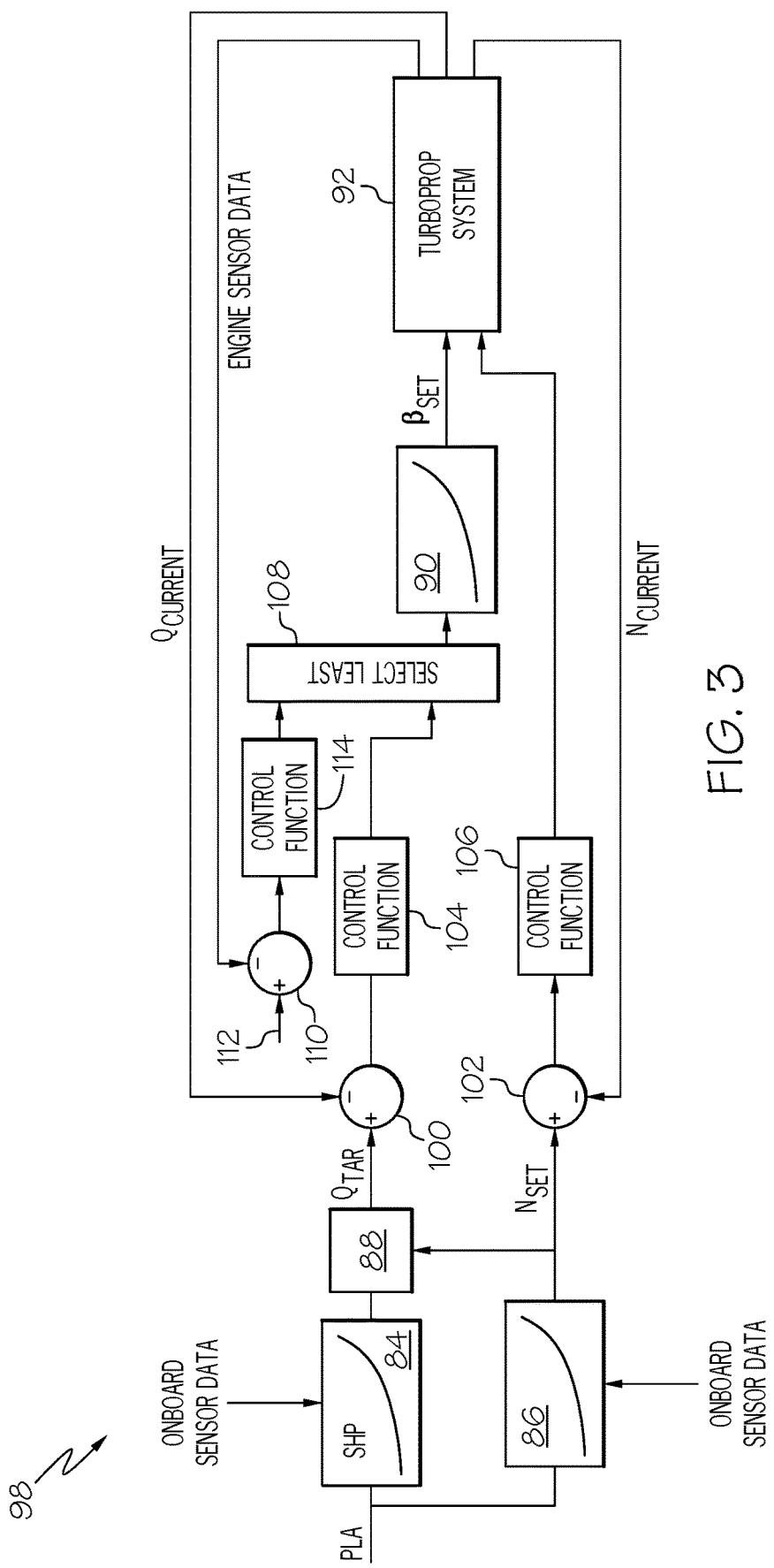
FIG. 3 is a schematic illustrating one manner in which a power/torque-based scheduling mode can be implemented by the control system of FIG. 1, as illustrated in accordance with a still further exemplary embodiment of the present invention.

FIG. 3 is a schematic illustrating a power/torque-based scheduling sub-process 98 carried-out by scheduling module 64 and feedback logic 94 when operating in a variation of SCHEDULING MODE 4, as illustrated in accordance with a further exemplary embodiment of the present invention. Certain features are shared between sub-process 98 shown in FIG. 3 and the master scheduling process 58 shown in FIG. 2; like reference numerals have thus been utilized to denote like logic or functional elements. Furthermore, as the manner in which the target torque output ($Q_{tar}$) and the rotational speed setpoint ($N_{set}$) are determined utilizing functions 84, 86, and 88 has been previously described, this description will not be repeated at this juncture to avoid redundancy. In the variation of SCHEDULING MODE 4 shown in FIG. 3, and in contrast to SCHEDULING MODE 4 shown in FIG. 2, the blade angle setpoint ($β_{set}$) is determined based on a target torque input (rather than a target torque input and an engine speed input) and adjustments in engine speed are further generated from the current PLA position, as described below.

As can be been seen in FIG. 3, the target torque output ($Q_{tar}$) and the rotational speed setpoint ($N_{set}$) are further applied to comparators 100 and 102, respectively, along with current torque output ($Q_{current}$) and the current engine rotational speed ($N_{current}$) detected by the engine sensors, such as sensors 26 and 28 shown in FIG. 1. The output signals of comparators 100 and 102 are then applied to control functions 104 and 106, respectively, which condition the signals by noise filtering, gain amplification, the application of leads or lags, and/or the like. The output signal of torque control function 104 is subsequently provided to Q/N-to-β conversion function 90, which generates a blade angle setpoint ($β_{set}$) for application to turboprop system 92 in the manner previously described. In contrast to torque control function 104, the output of engine speed control function 106 may be applied directly to turboprop system 92 for performing adjustment in engine rotational speed. A closed loop control system is thus provided, which functions to iteratively reduce any discrepancies that may exist between: (i) the target torque output ($Q_{tar}$) and the measured torque output ($Q_{current}$), as determined by comparator 100 and applied to function 90; and (ii) the rotational speed setpoint ($N_{set}$) and the measured engine rotational speed ($N_{current}$), as determined by comparator 102 and further applied to function applied 90. Similar closed loop feedback schemes can also be utilized when scheduling module 64 operates in the other control modes illustrated in FIG. 2.

Briefly referring again to FIG. 2, it may also be desirable to integrate a limiting function 96 into master scheduling process 58. Limiting function 96 can serve to override the power/torque-based scheduling logic in instances when the operating parameters of turboprop engine 12 risk exceeding maximum limits or predefined thresholds should the engine setpoints be adjusted in accordance with the target torque output ($Q_{tar}$) or target power output ($SHP_{tar}$). Consider, for example, sub-process 98 (FIG. 3) wherein such a limiting function is implemented, in part, through the provision of a SELECT LEAST function 108 between control function 104 and conversion function 90. Here, engine sensor data, as measured by sensors associated with turboprop engine 12 (FIG. 1), is applied to a comparator 110 and compared against one or more predetermined operational thresholds or preset limits, as represented in FIG. 3 by arrow 112. The preset limits may be recalled from memory 48 of turboprop control system 10 (FIG. 1). The particular type and number of operating characteristics that are monitored by turboprop control system 10 (FIG. 1) and compared to the operational limits at comparator 110 will vary amongst embodiments. However, a non-exhaustive list of such characteristics includes exhaust gas temperatures, bleed air temperatures, bleed air flow rates, mechanical stress levels, and engine rotational speeds. The discrepancies, if any, between the measured characteristic(s) and the preset limit(s) is outputted by comparator 110 and applied to SELECT LEAST function 108 along with the output of control function 104. A control function 114 can further be provided between the output of comparator 110 and the input of SELECT LEAST function 108 to provide signal conditioning similar to control functions 104 and 106, as previously described. Additionally, if desired, control function 114 can convert the signal provided by comparator 110 to a torque value to facilitate comparison by SELECT LEAST function 108 with the torque value output by comparator 100 and control function 104, as further described below.

With continued reference to FIG. 3, SELECT LEAST function 108 selects the minimum of the two inputs applied thereto. For example, SELECT LEAST function 108 can select between the applied inputs in accordance with the following instruction: "Select Minimum of {[predetermined operational characteristic—current value of the operational characteristic], [target torque output—current torque value]}." If the current operational characteristic or characteristics of turboprop engine 12 (FIG. 1) exceed their preset limit(s), SELECT LEAST function 108 effectively overrides torque-based scheduling of the blade angle ($\beta$) of turboprop engine 12 (FIG. 1). Instead, in such an instance, SELECT LEAST function 108 applies the output of comparator 110 to conversion function 90, which then schedules the engine setpoint or setpoints (in this case, blade angle) in a manner to prevent or at least reduce the likelihood of the monitored engine characteristic exceeding its predetermined operational threshold or preset limit. If the current value of the measured operational characteristics of turboprop engine 12 should exceed its limit, while the current torque output of turboprop engine 12 ($Q_{current}$) likewise exceed its target ($Q_{tar}$), SELECT LEAST function 108 will select the parameter that exceeds its limit or target by the greatest amount for subsequent application to conversion function 90. In this manner, if the disparity between the current torque output ($Q_{current}$) and the target torque ($Q_{tar}$) is more pronounced, blade angle ($\beta$) will be scheduled to reduce or eliminate the pronounced disparity in engine torque. Conversely, if there should exist a more pronounced disparity in the current value of the monitored operational characteristic of turboprop engine 12 relative to its preset limit, blade angle ($\beta$) will be scheduled to reduce or eliminate this disparity. Thus, by integrating SELECT LEAST function 108 or similar logic into power/torque-based scheduling sub-process 98, critical turboprop system parameters (e.g., torque, exhaust gas temperature, and other characteristics measured by the engine sensors and applied to comparator 110) can be better maintained within acceptable limits during operation of turboprop engine 12 (FIG. 1).

The foregoing has thus provided embodiments of systems and methods enabling single lever control of a turboprop engine. In the above-described exemplary embodiments, blade angle ($\beta$) and/or rotational speed (N) of a turboprop engine are adjusted in a manner providing a desired (e.g., substantially proportional) relationship between PLA position and the power output (SHP) of the engine. Such an approach enables the single lever control system to effectively schedule thrust for a turboprop engine in a manner similar to single lever turbofan and turbojet control systems. In this manner, embodiments of the single lever turboprop control system can provide improved continuity with the single lever control systems of turbojet and turbofan engines from both pilot interface and engine behavior standpoints. Still further benefits that can be provided by embodiments of the single lever turboprop control system may include the ability to operate multiple scheduling modes based on flight mode or otherwise selected to optimize engine performance; the ability to actively adjust the engine setpoint to reduce discrepancies between the target torque output ($Q_{tar}$) and/or the target power output ($SHP_{tar}$) and measured outputs of the turbofan engine through the inclusion of feedback control logic; and/or the inclusion of limiting functions enabling the power/torque-based scheduling logic to be overridden when appropriate to prevent or reduce the likelihood of operating parameters exceeding predetermined threshold or limits during operation of the turboprop engine.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. Various changes may be made in the function and arrangement of elements described in an exemplary embodiment without departing from the scope of the invention as set-forth in the appended Claims.

What is claimed is:

1. A method for operating a turboprop engine utilizing a single lever control system including a single lever control device operably coupled to an Engine Control Unit (ECU), the method comprising:
   at the ECU, monitoring for receipt of a Power Lever Angle (PLA) control signal from the single lever control device;
   when a PLA control signal is received at the ECU, establishing a target torque output for the turboprop engine as a function of at least the PLA control signal;
   determining an engine rotational speed setpoint as a function of the target torque output;
   determining a blade angle setpoint as a function of the target torque output;
   adjusting a blade angle of the turboprop engine in accordance with the blade angle setpoint; and
   adjusting a rotational speed of the turboprop engine in accordance with the engine rotational speed setpoint.

2. The method of claim 1 further comprising:
   measuring the current torque output of the turboprop engine after adjusting the blade angle and rotational speed of the turboprop engine; and
   further adjusting the blade angle and rotational speed of the turboprop engine to reduce any discrepancy between the current torque output and the target torque output.

3. The method of claim 1 wherein establishing comprises establishing the target torque output as a function of the PLA control signal and sensor data as provided by a sensor coupled to the turboprop engine.

4. The method of claim 1 further comprising:
   applying to a select least function: (i) a first input indicative of a difference between the target torque output and the current torque output of the turboprop engine, and (ii) a second input indicative of a difference between a predetermined limit of an operational characteristic of the turboprop engine and a current measured value thereof; and
   scheduling the blade angle setpoint and the engine rotational speed setpoint in accordance with the output of the select least function.

5. A method for operating a turboprop engine utilizing a single lever control system including a single lever control device operably coupled to an Engine Control Unit (ECU), the method comprising:
   at the ECU, monitoring for receipt of a Power Lever Angle (PLA) control signal from the single lever control device;
   when a PLA control signal is received at the ECU, establishing (i) a target torque output for the turboprop engine as a function of at least the PLA control signal and (ii) a rotational speed setpoint as a function of at least the PLA control signal;
   determining a blade angle setpoint utilizing the target torque output and the rotational speed setpoint; and
   adjusting a blade angle of the turboprop engine in accordance with the blade angle setpoint.

6. The method of claim 5 further comprising:
   measuring the current torque output of the turboprop engine after adjusting the blade angle of the turboprop engine; and
   further adjusting the blade angle of the turboprop engine to reduce any discrepancy between the current torque output and the target torque output.

7. The method of claim 5 wherein establishing comprises establishing the target torque output and the rotational speed setpoint as a function of the PLA control signal and sensor data as provided by a sensor coupled to the turboprop engine.

8. The method of claim 5 further comprising:
   applying to a select least function: (i) a first input indicative of a difference between the target torque output and the current torque output of the turboprop engine, and (ii) a second input indicative of a difference between a predetermined limit of an operational characteristic of the turboprop engine and a current measured value thereof; and
   scheduling the blade angle setpoint in accordance with the output of the select least function.

9. A single lever turboprop control system utilized to control a turboprop engine, the single lever turboprop control system comprising:
   a single lever control device; and
   an engine control unit (ECU) coupled to the single lever control device, the ECU configured to implement a scheduling module, the scheduling module responsive to one or more inputs supplied to the ECU to selectively operate in one of at least four different scheduling modes, wherein each of the at least four different scheduling modes:
   monitors for receipt of a Power Lever Angle (PLA) control signal from the single lever control device;
   when a PLA control signal is received at the ECU, establishes a target engine output for the turboprop engine as a function of at least the PLA control signal;
   determines a first engine setpoint utilizing the target engine output; and
   adjusts an operational parameter of the turboprop engine in accordance with the first engine setpoint.

10. The single lever turboprop control system of claim 9, further comprising:
    a pilot interface configured to receive pilot input and, in response to the pilot input, to supply the one or more inputs to the ECU.

11. The single lever turboprop control system of claim 9, further comprising:
    a plurality of sensors, each sensor configured to supply sensor data,
    wherein the one or more inputs comprise the sensor data supplied from one or more of the sensors.

* * * * *